US007992180B2

(12) United States Patent
Hayakawa

(10) Patent No.: US 7,992,180 B2
(45) Date of Patent: Aug. 2, 2011

(54) IMAGE DISPLAYING APPARATUS AND METHOD

(75) Inventor: Takeshi Hayakawa, Shiga (JP)

(73) Assignee: Panasonic Corporation, Osaka (JP)

( * ) Notice: Subject to any disclaimer, the term of this patent is extended or adjusted under 35 U.S.C. 154(b) by 1190 days.

(21) Appl. No.: 10/529,767

(22) PCT Filed: Sep. 10, 2004

(86) PCT No.: PCT/JP2004/013572
§ 371 (c)(1),
(2), (4) Date: Mar. 30, 2005

(87) PCT Pub. No.: WO2005/027509
PCT Pub. Date: Mar. 24, 2005

(65) Prior Publication Data
US 2006/0001771 A1    Jan. 5, 2006

(30) Foreign Application Priority Data
Sep. 12, 2003   (JP) .................. 2003-321331

(51) Int. Cl.
*H04N 7/173* (2006.01)
*H04N 7/16* (2006.01)
(52) U.S. Cl. .......... 725/99; 725/106; 725/122; 725/137
(58) Field of Classification Search .............. 725/99, 725/106, 122, 137
See application file for complete search history.

(56) References Cited

U.S. PATENT DOCUMENTS

| 6,011,537 | A  | * | 1/2000  | Slotznick ....................... 715/733 |
| 6,192,257 | B1 | * | 2/2001  | Ray ............................... 455/566 |
| 6,262,724 | B1 | * | 7/2001  | Crow et al. .................... 715/723 |
| 6,317,609 | B1 | * | 11/2001 | Alperovich et al. ........ 455/556.1 |
| 6,349,324 | B1 | * | 2/2002  | Tokoro .......................... 709/200 |
| 6,968,365 | B2 | * | 11/2005 | Hollström et al. ............ 709/217 |
| 7,228,061 | B2 | * | 6/2007  | Mori et al. ...................... 386/95 |
| 7,237,029 | B2 | * | 6/2007  | Hino et al. .................... 709/227 |
| 7,417,680 | B2 | * | 8/2008  | Aoki et al. ............... 348/333.05 |
| 2003/0229894 | A1 | * | 12/2003 | Okada et al. .................... 725/41 |
| 2005/0165918 | A1 | * | 7/2005  | Wantanabe et al. .......... 709/223 |
| 2006/0066578 | A1 | * | 3/2006  | Sugimoto ..................... 345/169 |
| 2007/0300282 | A1 | * | 12/2007 | Aratani et al. ................ 725/141 |

FOREIGN PATENT DOCUMENTS

| JP | 10-243273  | 9/1998 |
| JP | 11-004390  | 1/1999 |
| JP | 2002-135676 | 5/2002 |
| JP | 2002-158948 | 5/2002 |
| JP | 2003-250106 | 9/2003 |
| WO | 02/01545   | 1/2002 |

* cited by examiner

*Primary Examiner* — Pankaj Kumar
*Assistant Examiner* — Franklin Andramuno
(74) *Attorney, Agent, or Firm* — Wenderoth, Lind & Ponack, L.L.P.

(57) ABSTRACT

Provided is an apparatus and method for displaying images, which enables a selected image to be displayed in full screen mode or slide show mode on the TV receiver, while images stored in the recording medium are being displayed on the remote controller. The apparatus and method can also display the thumbnail in an image display area by putting time periods on the vertical axis and photography locations on the horizontal axis.

6 Claims, 13 Drawing Sheets

FIG. 5

| 501 | 502 | 503 | 504 | 505 | 506 |
|---|---|---|---|---|---|
| Number | File name | Selected flag | Related information including the date and time of photography and GPS information | Pointer to thumbnail image data | Pointer to main image data |
| 1 | ○○○ | 0 | | SP_1 | MP_1 |
| 2 | ××× | 1 | | SP_2 | MP_2 |
| ⋮ | ⋮ | ⋮ | | ⋮ | ⋮ |
| N | △△△ | 0 | | SP_N | MP_N |

| 1201 | 1202 | 1203 | 1204 / 1205 | 1206 / 1207 | 1208 / 1209 | 1210 / 1211 |
|---|---|---|---|---|---|---|
| Prefecture | Municipal | Area | Upper Left Latitude | Upper Left Longitude | Lower Left Latitude | Lower Left Longitude |
| Prefecture A | Town X | a | N 46 00 08 | E 147 59 44 | N 45 20 45 | E 147 59 44 |
| Prefecture B | Town Y | b | N 47 00 08 | E 148 59 44 | N 46 20 45 | E 148 59 44 |
| ⋮ | ⋮ | ⋮ | ⋮ | ⋮ | ⋮ | ⋮ |
| Prefecture C | Town Z | c | N 48 00 08 | E 149 59 44 | N 47 20 45 | E 149 59 44 |

| 1201 | 1202 | 1203 | 1212 / 1213 | 1214 / 1215 | 1216 / 1217 | 1218 / 1219 |
|---|---|---|---|---|---|---|
| Prefecture | Municipal | Area | Upper Right Latitude | Upper Right Longitude | Lower Right Latitude | Lower Right Longitude |
| Prefecture A | Town X | a | N 46 00 08 | E 148 59 44 | N 46 20 45 | E 148 59 44 |
| Prefecture B | Town Y | b | N 47 00 08 | E 149 59 44 | N 47 20 45 | E 149 59 44 |
| ⋮ | ⋮ | ⋮ | ⋮ | ⋮ | ⋮ | ⋮ |
| Prefecture C | Town Z | c | N 48 00 08 | E 150 59 44 | N 48 20 45 | E 150 59 44 |

IMAGE DISPLAYING APPARATUS AND METHOD

This Application is a U.S. National Phase Application of PCT International Application PCT/JP2004/013572.

TECHNICAL FIELD

The present invention relates to an apparatus and method for displaying images, and more specifically, to an apparatus and method for displaying images which can display images from a recording medium on a TV receiver, and can also display the thumbnails of the images on a remote controller.

BACKGROUND ART

A well-known conventional TV receiver connects itself to a recording medium and displays on its screen the thumbnails of images stored in the recording medium as a headline list by using an image viewer application. One such TV receiver is disclosed in Japanese Patent Unexamined Publication No. 2002-135676. This type of TV receiver allows the user to select a desired thumbnail from the thumbnail display area via an input device such as a remote controller so that the image represented by the selected thumbnail can be displayed in full screen.

It is also a well-known technique to display both the thumbnails of images and a larger image of a selected thumbnail at the same time on the same display screen. One such example is disclosed in Japanese Patent Unexamined Publication No. H10-243273.

DISCLOSURE OF THE INVENTION

An apparatus for displaying images comprises a TV receiver which displays images from a recording medium, and a remote controller which controls the TV receiver:
  Wherein the TV receiver comprises:
    a media insertion means for inserting the recording medium;
    a media control means for forming a display image list, based on image information from the recording medium, when detecting insertion of the recording medium into the media insertion means;
    a first display-image-list storage means for storing the display image list;
    a first display means for displaying an image; and
    a first control means for transmitting the display image list to the remote controller, and for, when receiving control information from the remote controller, outputting the image from the recording medium to the first display means, based on the control information and the display image list stored in the first display-image-list storage means; and
  wherein the remote controller comprises:
    a second display-image-list storage means for storing the display image list;
    a second display means for displaying an image; and
    a second control means for, when receiving the display image list from the TV receiver, making the second display-image-list storage means store the display image list, and for, when receiving control information from a user, transmitting the control information to the TV receiver and outputting the image from the recording medium to the second display means, based on the control information and the display image list stored in the second display-image-list storage means.

A method for displaying images comprises a TV receiver which displays images from a recording medium, and a remote controller which controls the TV receiver:
  Wherein the TV receiver comprises the steps of:
    inserting the recording medium;
    forming a display image list, based on image information from the recording medium, when detecting insertion of the recording medium;
    storing the display image list;
    transmitting the display image list to the remote controller; and
    displaying an image from the recording medium when receiving control information from the remote controller, based on the control information and the display image list stored; and
  wherein the remote controller comprises the steps of:
    storing the display image list when receiving the display image list from the TV receiver; and
    transmitting, when receiving control information from a user, the control information to the TV receiver, and displaying the image from the recording medium, based on the control information and the display image list stored.

BRIEF DESCRIPTION OF THE DRAWINGS

FIG. 5 is a view showing the structure of a display image list.

FIG. 12 is views showing the structure of map information.

DETAILED DESCRIPTION OF PREFERRED EMBODIMENTS

In the aforementioned TV receiver disclosed in Japanese Patent Unexamined Publication No. 2002-135676, when an image represented by a desired thumbnail selected from the thumbnail display area is desired to be displayed in full screen, the image display mode is switched from thumbnail to full screen. Therefore, if the user wants to return to thumbnail mode, the image display mode must be switched again from full screen to thumbnail, thus bothering the user.

On the other hand, in the aforementioned art disclosed in Japanese Patent Unexamined Publication No. H10-243273, both the thumbnails of images and a larger image of a selected thumbnail can be displayed at the same time on the display screen. This makes it unnecessary to switch from thumbnail mode to full screen mode, thereby providing an improvement in terms of operation. However, the concurrent display limits the size of the larger image, thus leaving the problem that the larger image is not large enough to be recognizable unsolved.

In addition, the thumbnail display in Japanese Patent Unexamined Publications No. 2002-135676 and No. H10-243273 mentioned above is a mere list of image thumbnails in a time series, so that the user can only view thumbnails in terms of time.

First Exemplary Embodiment

An apparatus for displaying images according to a first embodiment of the present invention is formed of TV receiver 100 which has an insertion slot to insert a recording medium, and remote controller 200 which displays the thumbnails of images stored in the recording medium and which controls TV receiver 100.

Figure 1:
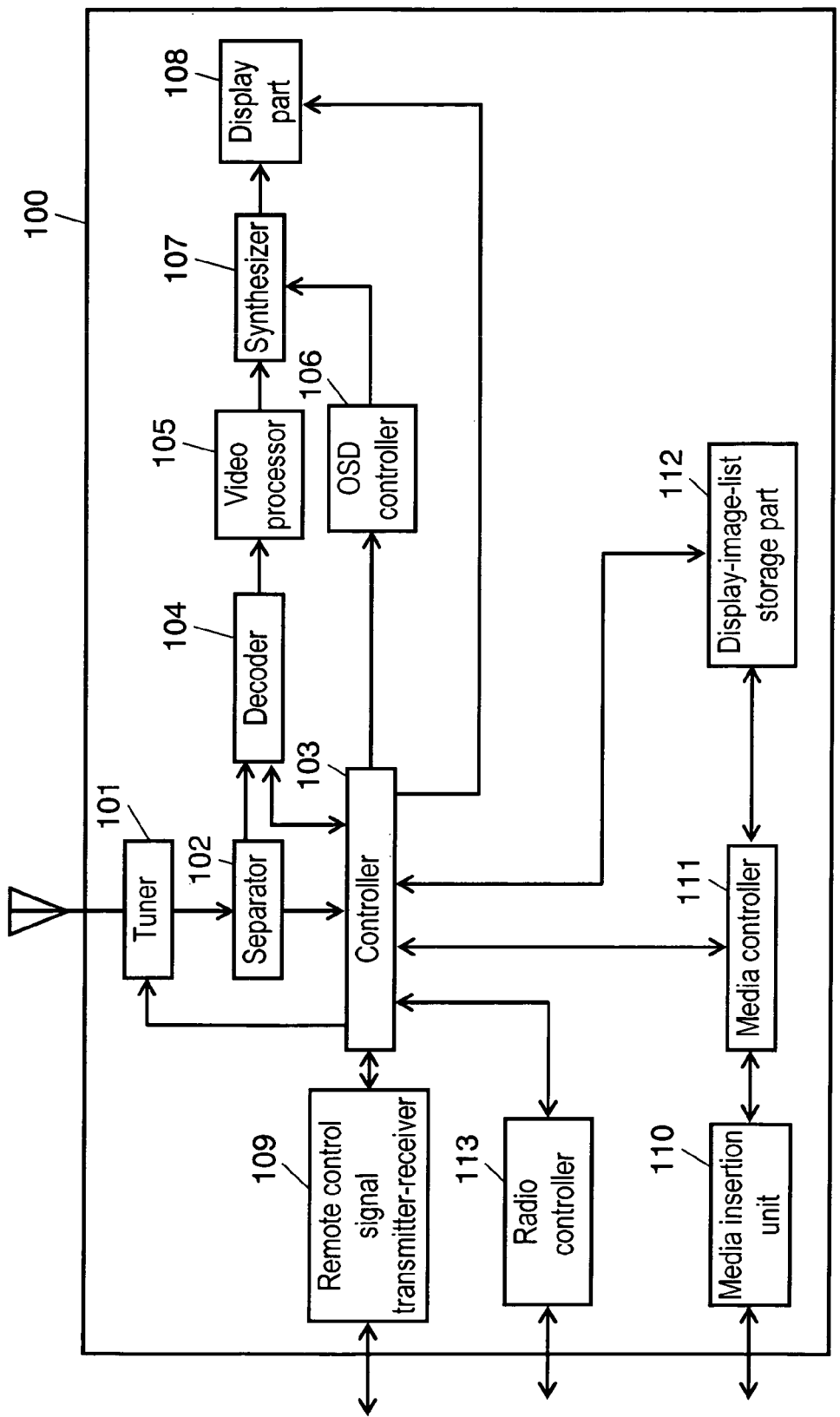
FIG. 1 is a block diagram showing the structure of a TV receiver according to a first embodiment of the present invention.

FIG. 1 is a block diagram showing the structure of TV receiver 100 according to the first embodiment of the present invention. TV receiver 100 is formed of tuner 101, separator 102, controller 103, decoder 104, video processor 105, OSD controller 106, synthesizer 107, display part 108, remote control signal transmitter-receiver 109, media insertion unit 110, media controller 111, display-image-list storage part 112 and radio controller 113.

Tuner 101 receives a TV broadcast signal based on a channel selection instruction from controller 103, then subjects the received TV broadcast signal to a high frequency process and demodulation process, and outputs the processed signal as a transport stream to separator 102.

Separator 102 separates the transport stream from tuner 101 into additional information such as program information, and digital video/audio signals which are MPEG data. Separator 102 then outputs the MPEG data to decoder 104, and the additional information to controller 103.

Controller 103, when receiving a request for channel selection from remote control signal transmitter-receiver 109, makes a request of tuner 101 to select the channel. Controller 103 also outputs to OSD controller 106 program information data necessary for a predetermined operation to view the program on the selected channel, out of the additional information obtained from separator 102. In addition, when obtaining an image display request from remote control signal transmitter-receiver 109 or a notice from media controller 111, controller 103 performs a process for inserting the recording medium, a process for switching image display modes or a process for extracting the recording medium in accordance with the acquired request or notice. These processes will be detailed later with reference to FIGS. 6 and 8.

Decoder 104, when receiving a video processing request from controller 103, decodes the MPEG data from separator 102 and outputs it as a video signal to video processor 105. On the other hand, when receiving an image processing request from controller 103, decoder 104 decodes the image data from controller 103 and outputs it as an image signal to video processor 105.

Video processor 105 provides the video or image signal from decoder 104 with adjustments in brightness, contrast and the like, and outputs these signals as video data or image data to synthesizer 107.

OSD controller 106 outputs the program information data from controller 103 as OSD display data to synthesizer 107. When obtaining a thumbnail display request from controller 103, OSD controller 106 forms a thumbnail frame, and outputs OSD display data which contains identification mark data corresponding to the position designated as the thumbnail frame to synthesizer 107. The term "identification mark data" indicates data to highlight the thumbnail frame in the designated position.

Synthesizer 107 synthesizes video data or image data from video processor 105 with the OSD display data from OSD controller 106, and outputs it as a video signal or an image signal to display part 108.

Display part 108, when obtaining a video processing request from controller 103, displays the video signal from synthesizer 107. On the other hand, when receiving an image processing request from controller 103, display part 108 displays the image signal from synthesizer 107. Image display modes available will be detailed later with reference to FIG. 4.

Remote control signal transmitter-receiver 109 receives a remote control signal from remote controller 200, and outputs it as a remote controller reception signal to controller 103. Remote control signal transmitter-receiver 109 also transmits requests from controller 103 as remote controller transmission signals to remote controller 200.

Media insertion unit 110 is an insertion slot to insert a recording medium such as an SD card. A method for storing image data in a recording medium will be detailed later with reference to FIG. 3.

Media controller 111 detects insertion/extraction of the recording medium to/from media insertion unit 110, and provides notifications to controller 103. Media controller 111 then forms a display image list based on a request from controller 103. The display image list will be detailed later with reference to FIG. 5.

Display-image-list storage part 112 stores a display image list from media controller 111.

Radio controller 113 transmits the display image list stored in display-image-list storage part 111 to remote controller 200 by radio with a standard such as BLUETOOTH or IEEE802.11b. Furthermore, when receiving a request for an Exif image file from remote controller 200, radio controller 113 transmits the file to remote controller 200. Thus, radio controller 113 transmits and receives comparatively large data such as a display image list and image data.

Figure 3:
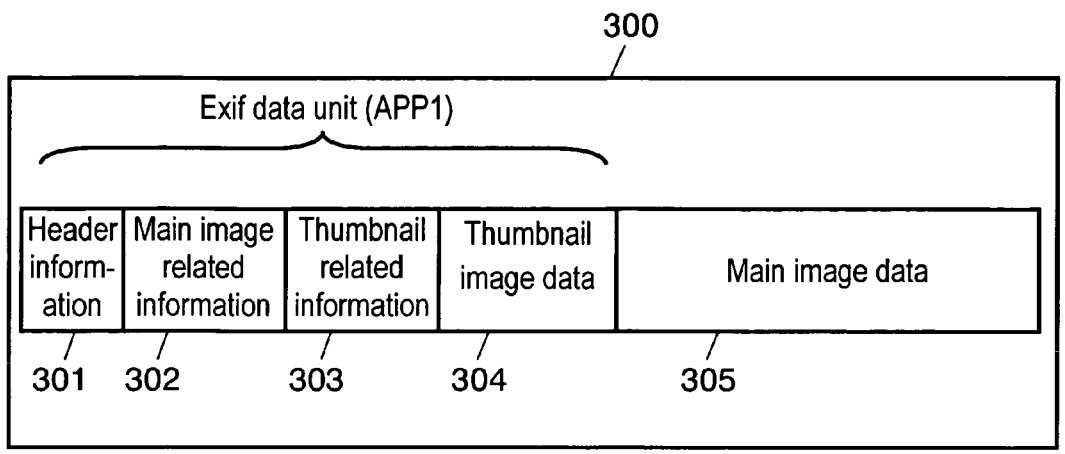
FIG. 3 is a view showing the structure of image data stored in a recording medium.

The method for storing image data in the recording medium will be described as follows with reference to FIG. 3. Image data 300 stored in the recording medium has been recorded with a digital still camera, based on the Digital Still Camera Image File Format Standard (Exif). Here, an image stored as main data is referred to as a "main image", and a small image for the headline of the main image is referred to as a "thumbnail". Image data 300 is formed of header information 301, main image data 305, main image related information 302, thumbnail image data 304 and thumbnail related information 303. Header information 301 includes the file or data format to identify whether Exif or Jfif, and the byte order to identify whether big-endian or little endian. Main image related information 302 is formed of related information of image data 300, information related to photography requirements and information related to GPS. The related information of image data 300 includes information other than images, such as resolution, compression type and pixel configuration. The information related to photography requirements includes the date and time of photography, subject distance, shutter speed, etc. The information related to GPS includes longitude, latitude, height, etc.

Figure 4:
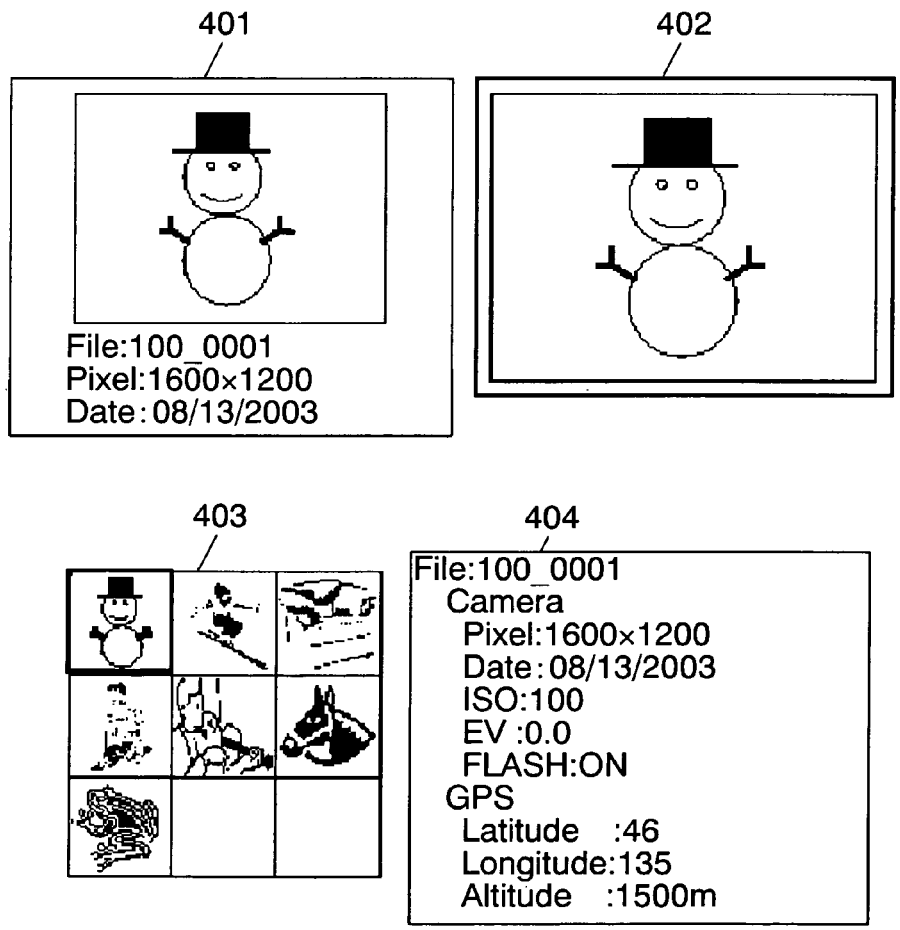
FIG. 4 is views showing display modes for the image data stored in the recording medium.

The image display modes will be described as follows with reference to FIG. 4. The image display modes available are: "full screen mode" 401, "slide show mode" 402, "thumbnail mode" 403 and "related information mode" 404. "Full screen mode" 401 displays both one frame of main image data 305 and main image related information 302 at the same time. "Slide show mode" 402 displays main image data 305 as sequential frames on the full screen of display part 108. "Thumbnail mode" 403 displays thumbnail image data 304 in the ratio of, for example, 3×3 after sorting the data according to the file names. "Related information mode" 404 displays main image related information 302 of main image data 305 only in text mode. In thumbnail mode, a thumbnail put in the thumbnail frame formed by OSD controller 106 is further highlighted with a frame or the like. In "slide show mode", the main images are displayed one after another at a predetermined time interval in the order of the image display list.

The structure of the display image list will be described as follows with reference to FIG. 5. Display image list 500 is formed of numbers 501 assigned serially for sorting; file names 502; selection status flags 503 to identify whether the image is selected or not; related information 504 including GPS positional information and information related to photography such as Exif; pointers 505 to thumbnail image data 304; and pointers 506 to main image data 305. Here, display image list 500 is stored in the same structure both in TV receiver 100 and remote controller 200.

Figure 2:
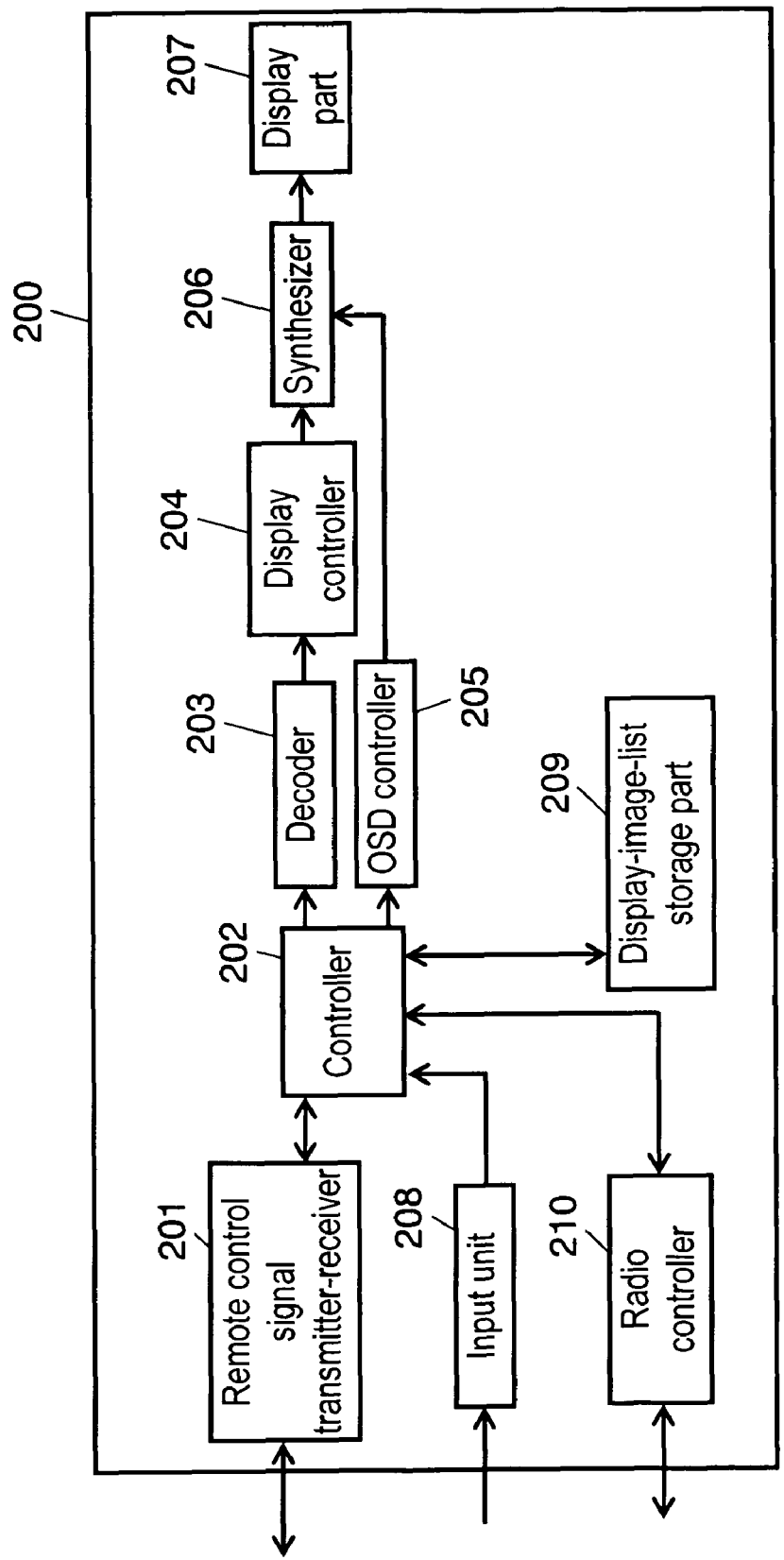
FIG. 2 is a block diagram showing the structure of a remote controller according to the first embodiment of the present invention.

The structure of remote controller 200 according to the first embodiment of the present invention will be described as follows with reference to FIG. 2. Remote controller 200 is formed of remote control signal transmitter-receiver 201, controller 202, decoder 203, display controller 204, OSD controller 205, synthesizer 206, display part 207, input unit 208, display-image-list storage part 209 and radio controller 210.

Remote control signal transmitter-receiver 201 receives a remote control signal from TV receiver 100, and outputs it as a remote controller reception signal to controller 202. Remote control signal transmitter-receiver 201 also transmits requests from controller 202 as remote controller transmission signals to TV receiver 100.

Controller 202, when the user selects a desired channel via input unit 208, transmits a request for channel selection to remote control transmitter-receiver 201. When radio controller 210 receives display image list 500 as a radio signal, controller 202 outputs display image list 500 to display-image-list storage part 209. Controller 202 also performs a process for inserting a recording medium, a process for switching image display modes or a process for extracting the recording medium in accordance with a request from input unit 208. These processes will be detailed later with reference to FIGS. 7 and 9.

Controller 202 instructs radio controller 210 to obtain Exif image data stored in the recording medium of TV receiver 100. Later, controller 202 transmits the Exif image data to decoder 203.

Decoder 203 decodes the Exif image data from controller 202, and converts it into a video signal displayable on display part 207. Display controller 204 provides the video signal with adjustments in brightness, contrast and the like, and outputs it to synthesizer 206.

OSD controller 205, when receiving a thumbnail display request from controller 202, forms a thumbnail frame and outputs it to synthesizer 206, so that the highlighting frame can be displayed on the currently selected image.

Synthesizer 206 synthesizes the video signal of the image data from display controller 204 with the OSD display data from OSD controller 205, and outputs the synthesized data as a video signal to display part 207.

Display part 207 displays the video signal from synthesizer 205.

Input unit 208 accepts user input through the ten keys or predetermined buttons on remote controller 200.

Display-image-list storage part 209 stores display image list 500 obtained by radio from TV receiver 100.

Radio controller 210 transmits and receives comparatively large data such as a display image list and JPEG image data used in the apparatus for displaying images in accordance with instructions of controller 202.

Figure 6:
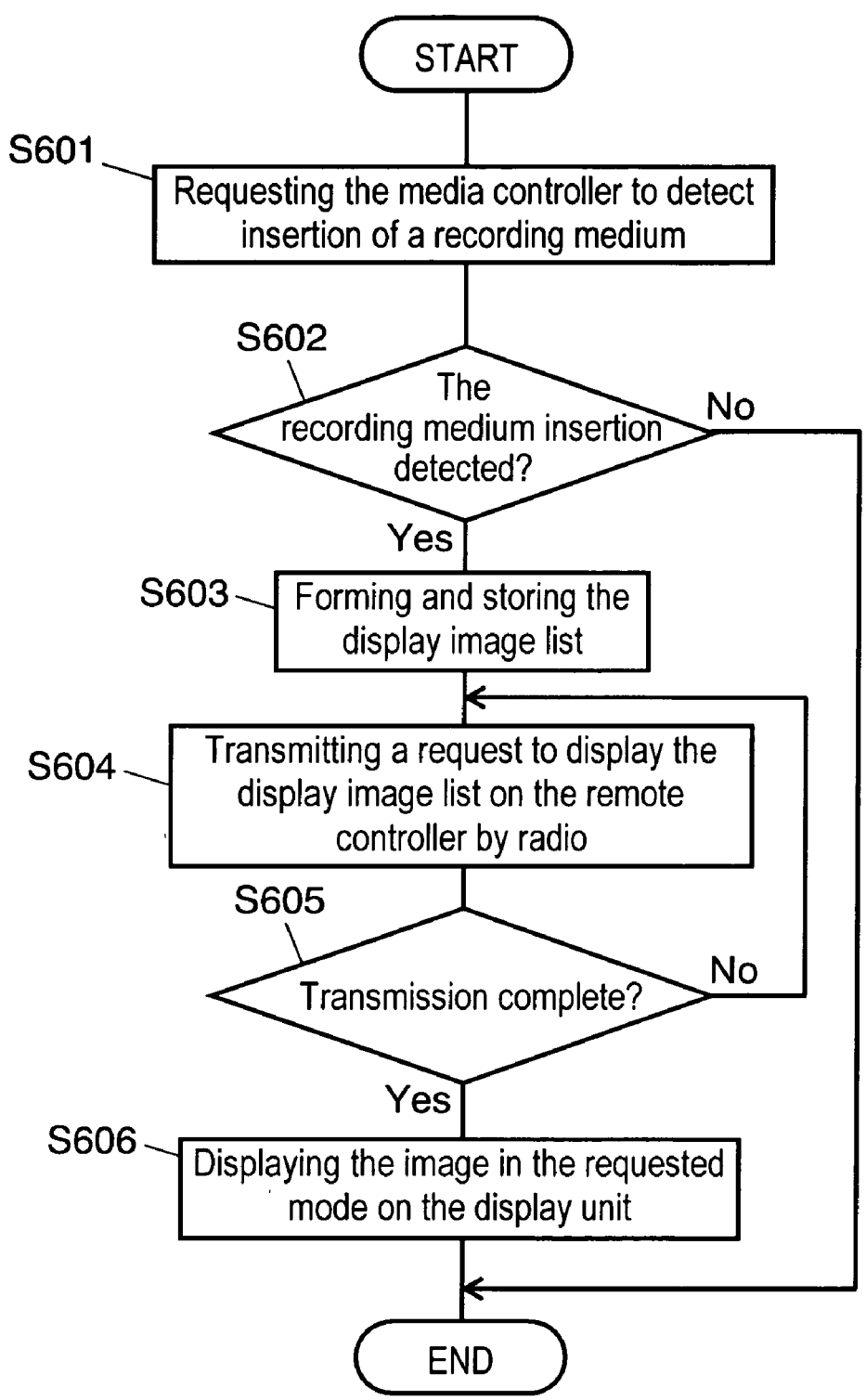
FIG. 6 is a flowchart depicting a process done by the TV receiver according to the first embodiment of the present invention when the recording medium is inserted.
Figure 7:
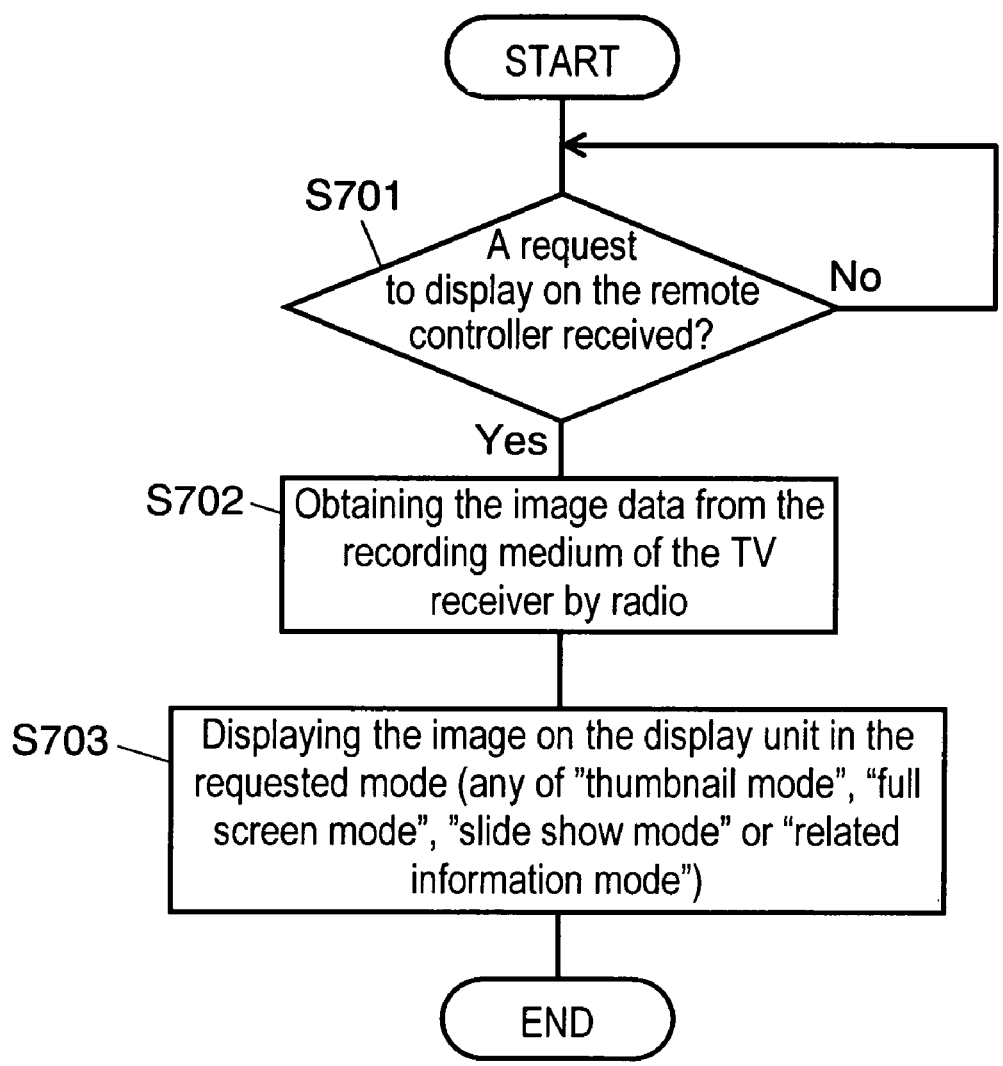
FIG. 7 is a flowchart depicting a process done by the remote controller according to the first embodiment of the present invention when the recording medium is inserted.

The aforementioned process for inserting a recording medium with TV receiver 100 and remote controller 200 will be detailed as follows with reference to FIGS. 6 and 7. FIG. 6 is a flowchart depicting the process in TV receiver 100, and FIG. 7 is a flowchart depicting the process in remote controller 200.

In TV receiver 100, controller 103 makes a request of media controller 111 to periodically monitor insertion/extraction of a recording medium to/from media insertion unit 110 (S601). When detecting the insertion of the recording medium (YES at S602), media controller 111 notifies controller 103 of the insertion of the recording medium. Controller 103 instructs media controller 111 to read the image file in the recording medium, to extract necessary information from the Exif file structure shown in FIG. 3, and to form and store display image list 500 (S603). After the formation of display image list 500, controller 103 transmits display image list 500 to remote controller 200 by radio (S604). When this transmission cannot be complete within the time (NO at S605), a retransmission is performed. In contrast, when the transmission is complete within the time (YES at S605), controller 103 makes a request of decoder 104 and display part 108 to process images (full screen mode, slide show mode, or thumbnail mode), and displays the images in "full screen mode", "slide show mode" or "thumbnail mode", based on the request (S606). The display mode is preset when the recording medium is inserted. In the first embodiment, the display mode is preset to "full screen" when the recording medium is inserted.

On the other hand, in remote controller 200, when receiving display image list 500 from TV receiver 100 (YES at S701), remote control signal transmitter-receiver 201 obtains image data from the recording medium of TV receiver 100. Then, remote control signal transmitter-receiver 201 makes display part 206 display the images in a preset mode out of "full screen mode", "slide show mode", "thumbnail mode" and "related information mode" (S703). In the first embodiment, "thumbnail mode" is preset as the display mode when the recording medium is inserted.

Figure 8:
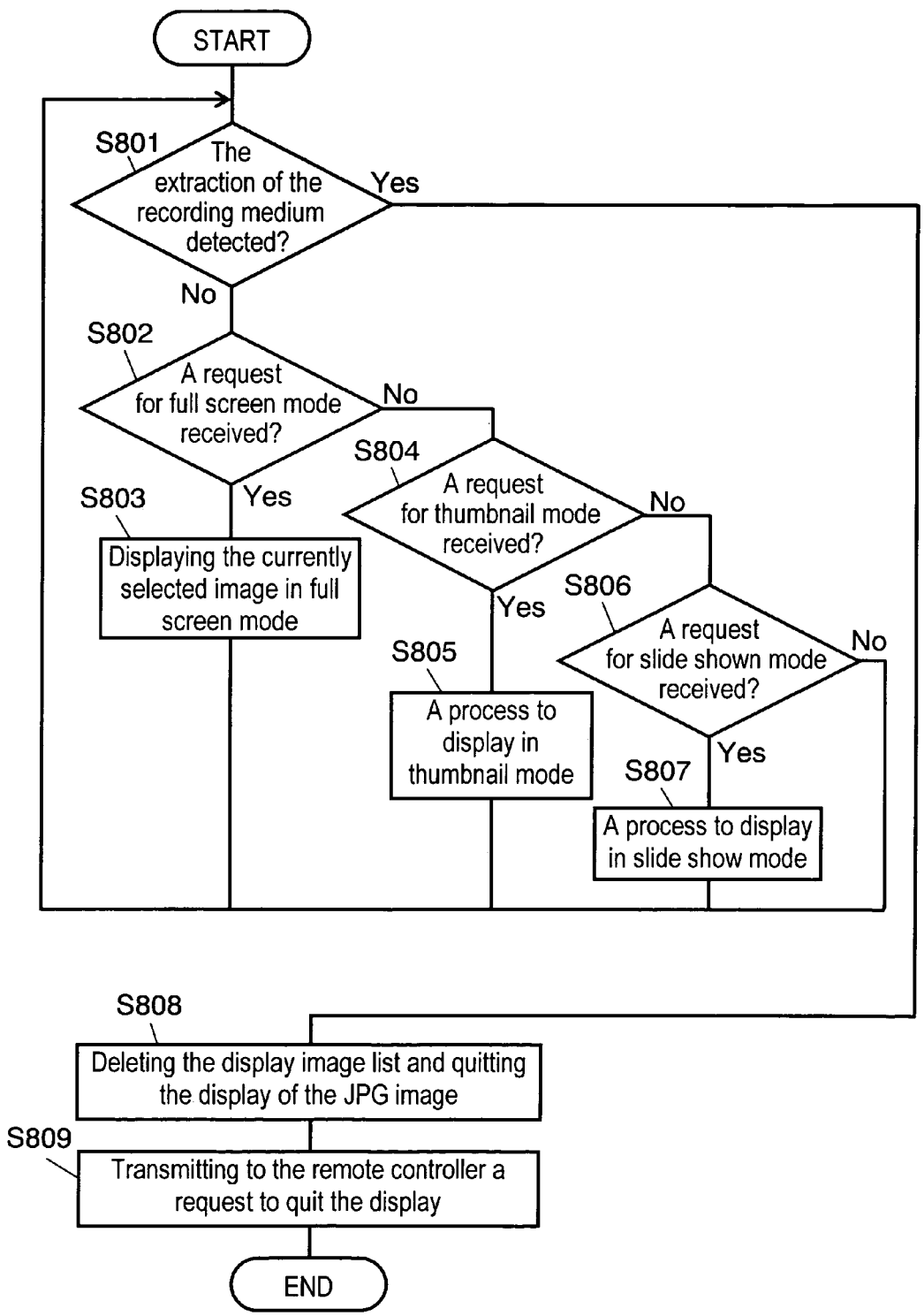
FIG. 8 is a flowchart depicting a process done by the TV receiver according to the first embodiment of the present invention after the recording medium is inserted.
Figure 9:
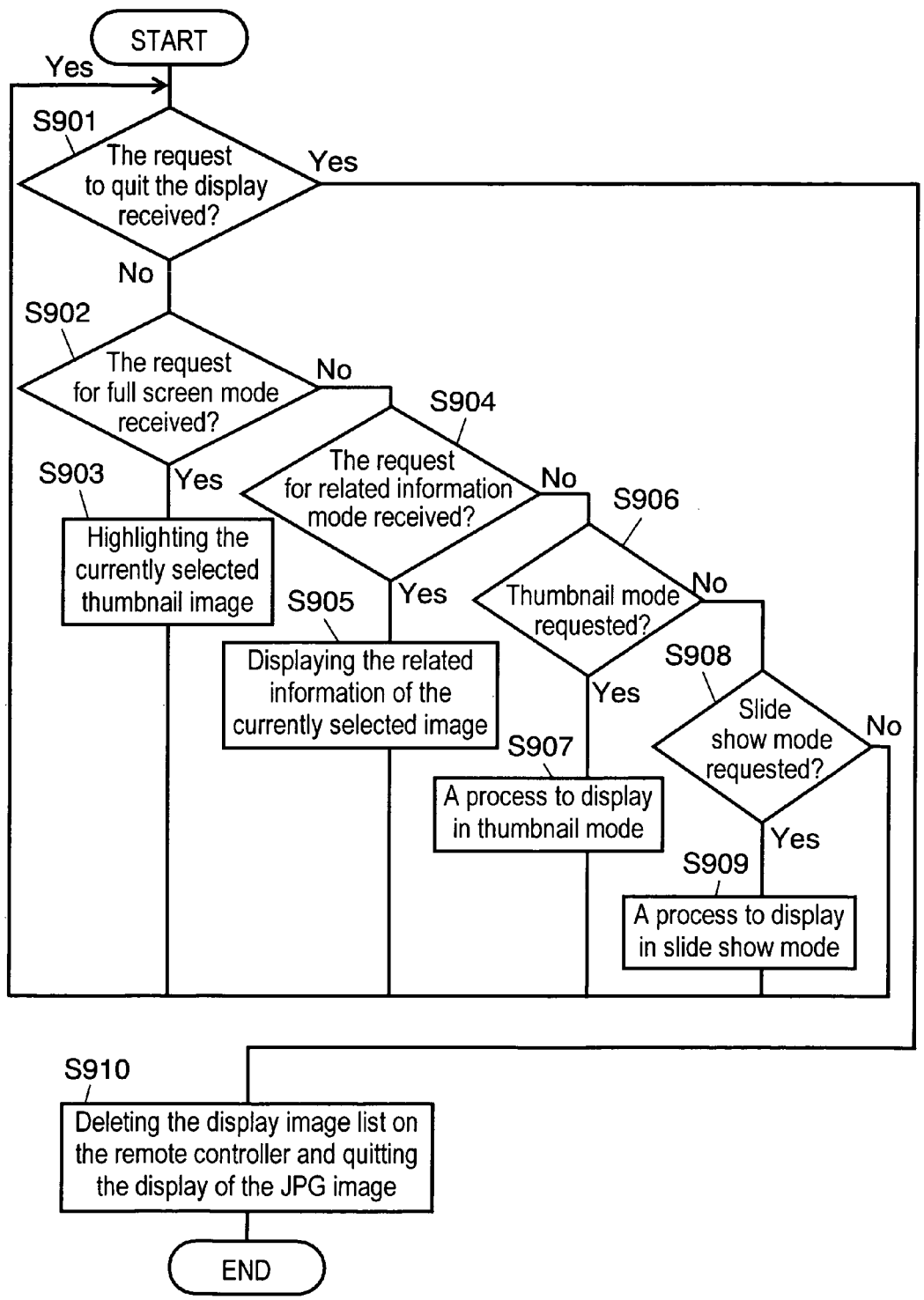
FIG. 9 is a flowchart depicting a process done by the remote controller according to the first embodiment of the present invention after the recording medium is inserted.

The following is a description about the process for switching image display modes and the process for extracting the recording medium with reference to FIGS. 8 and 9. FIG. 8 is a flowchart depicting the processes in TV receiver 100, and FIG. 9 is a flowchart depicting the processes in remote controller 200.

First of all, the processes in TV receiver 100 will be described as follows. In TV receiver 100, controller 103 makes a request of media controller 111 to periodically monitor insertion/extraction of the recording medium to/from media insertion unit 110 (S801). When detecting the extraction of the recording medium (YES at S801), media controller 111 notifies controller 103 of the extraction of the recording medium. Controller 103 makes a request of media controller 111 to delete display image list 500 from display-image-list storage part 112, and quits the display of the JPEG image (S808). After deleting display image list 500, controller 103 makes a request of remote controller 200 to delete the display image list (S809), and also makes a request of decoder 104 to perform video processing, so the process for inserting the recording medium shown in FIG. 6 is resumed.

Controller 103 periodically monitors the reception of a request from the user as well as making a request to monitor the insertion/extraction of the recording medium. When receiving a request for full screen mode, slide show mode or thumbnail mode (NO at S801, and 5802 to S807), controller 103 makes display part 108 display the images in accordance with the request.

The following is a description about the processes in remote controller 200. In remote controller 200, controller 202 periodically monitors the presence or absence of a request to quit the display as a remote controller reception signal (S901). When receiving the request to quit the display (YES at S901), controller 202 deletes display image list 500 from display-image-list storage part 209 and quits the display of the JPEG image (S910), so the process for receiving the recording medium shown in FIG. 7 is resumed.

Controller 202 periodically monitors the reception of a request from the user as well as monitoring the request to quit the display. When receiving a request for "full screen mode", "related information mode", "thumbnail mode" or "slide show mode" (NO at 5901, and 5902 to S909), controller 202 makes display part 206 display the images in accordance with the request.

Figure 10:
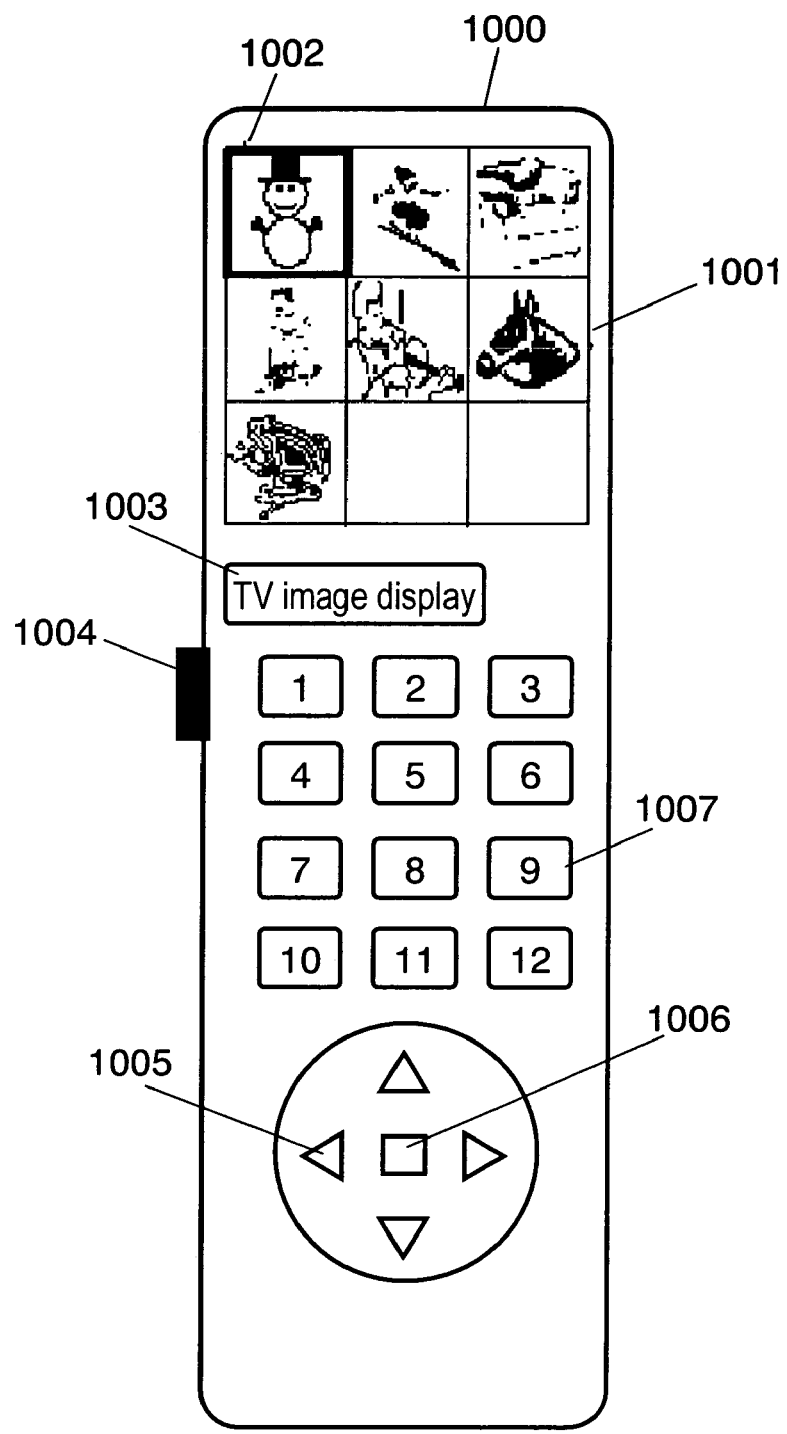
FIG. 10 is a view showing a specific example of the remote controller according to the first embodiment of the present invention.

A specific structure of remote controller 200 will be described as follows with reference to FIG. 10. FIG. 10 is an example of remote controller 200 according to the first embodiment. In remote controller 1000, display part 1001 displays images in "thumbnail mode" 403, "full screen mode" 401, "slide show mode" 402 or "related information mode" 404 described above with FIG. 4. FIG. 10 shows an example of thumbnail mode. The currently selected image is highlighted in thumbnail frame 1002. Remote controller 1000 includes TV image display key 1003 and remote controller image display key 1004. Pressing TV image display key 1003 allows a request for displaying images to be transmitted to TV receiver 100. Consequently, display part 108 on TV receiver 100 changes the image display mode in the following order: thumbnail mode, full screen mode and slide show mode. Pressing remote controller image display key 1004 allows display part 1001 on remote controller 1000 to change its image display mode to any of thumbnail mode, full screen mode, related information mode and slide show mode.

In order to allow TV receiver 100 and remote controller 1000 to always select the same image as each other, when the currently selected image is changed to another, that is, when thumbnail frame 1002 is moved onto a next image, the number of the currently selected image on remote controller 1000 is transmitted to TV receiver 100. As a result, selection status flag 503 becomes "1" for the image currently selected in display-image-list storage part 112 of TV receiver 100 and in display-image-list storage part 209 of remote controller 200, whereas selection status flags 503 are changed to "0" for the other images.

Changing the currently selected image in thumbnail mode is done by arrow keys 1005 or ten key 1007. Pressing Enter key 1006 in the center of arrow keys 1005 allows a command to be transmitted to TV receiver 100 where it is requested that the currently selected image be displayed in full screen mode.

The image display mode in TV receiver 100 and in remote controller 1000 can be selected separately by the user. For example, when TV receiver 100 is in "slide show mode", remote control 1000 can be in "related information mode". As another example, when TV receiver 100 is in "full screen mode", remote control 1000 can be in "thumbnail mode". Other combinations are also possible.

When an image from the recording medium is displayed on display part 1001 of remote controller 1000, if the user selects a desired channel via input unit 207, a request for channel selection is transmitted to remote control transmitter-receiver 201. In that case, TV receiver 100 terminates the image viewer application and performs the channel selection.

The first embodiment is so structured that an image from the recording medium is displayed on TV receiver 100 and remote controller 1000 immediately after the recording medium is inserted. As another structure, it is possible to first display an icon or message to identify insertion of the recording medium when the recording medium is inserted, and then to display the image from the recording medium on the display screen by making the user select the icon or message.

Second Exemplary Embodiment

An apparatus for displaying images according to a second embodiment of the present invention is formed of TV receiver 1100 which has an insertion slot to insert a recording medium, and remote controller 200 which displays the thumbnails of images stored in the recording medium and which controls TV receiver 100. The second embodiment is achieved in the same manner as the first embodiment except that the thumbnails of images are displayed in a two-dimensional image display area with a time axis and photography locations.

Figure 11:
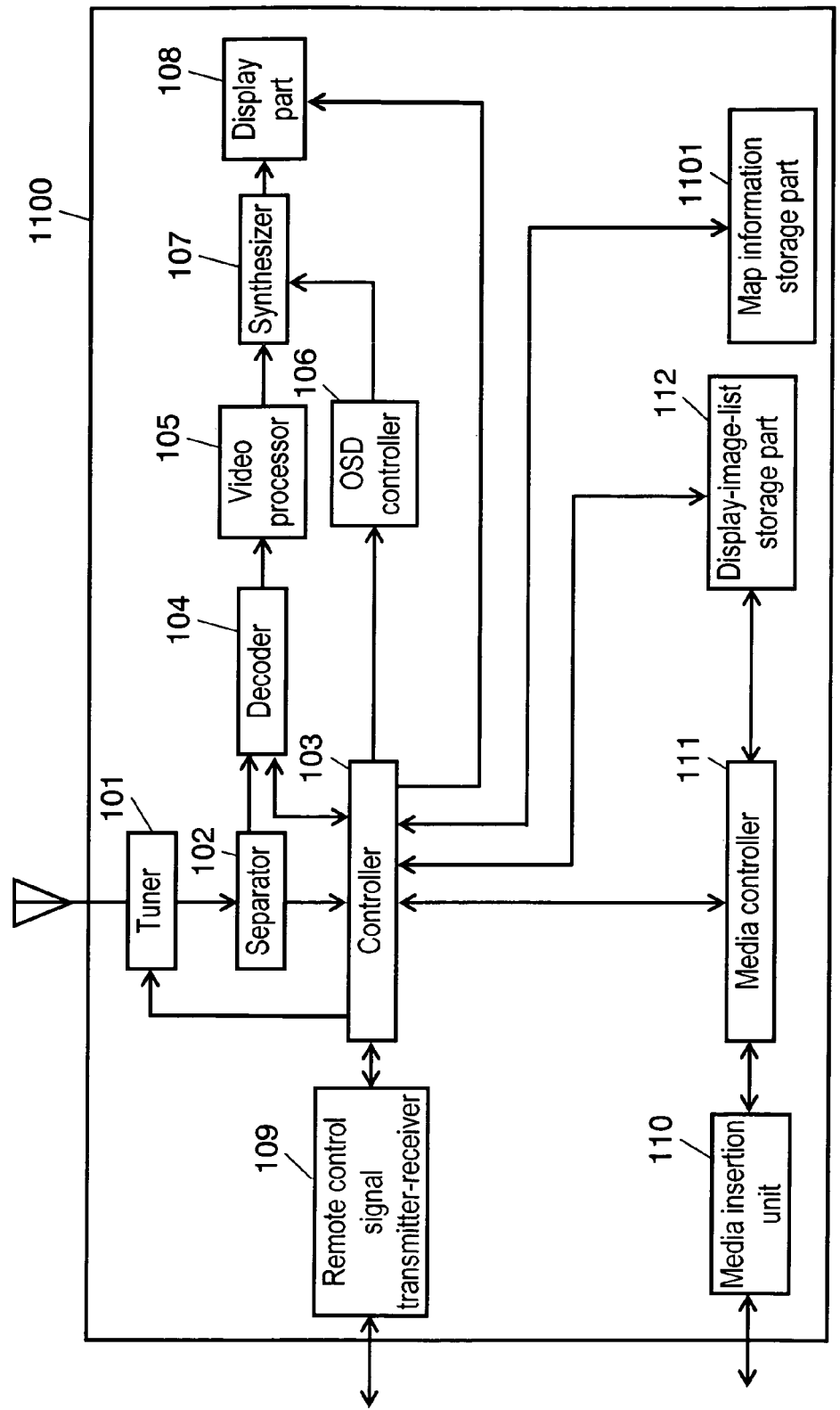
FIG. 11 is a block diagram showing the structure of a TV receiver according to a second embodiment of the present invention.

FIG. 11 is a block diagram showing the structure of TV receiver 1100 according to the second embodiment of the present invention. TV receiver 1100 is formed of tuner 101, separator 102, controller 103, decoder 104, video processor 105, OSD controller 106, synthesizer 107, display part 108, remote control signal transmitter-receiver 109, media insertion unit 110, media controller 111, display-image-list storage part 112 and map information storage part 1101. In FIG. 11, the components referred to with the same reference numerals as those in FIG. 1 have equivalent functions to those in FIG. 1, so their description will be omitted.

Map information storage part 1101 stores map information to predetermine the photography location. FIG. 12 shows the structure of the map information. Map information 1200 includes prefectures 1201, municipals 1202 and areas 1203.

Figure 13:
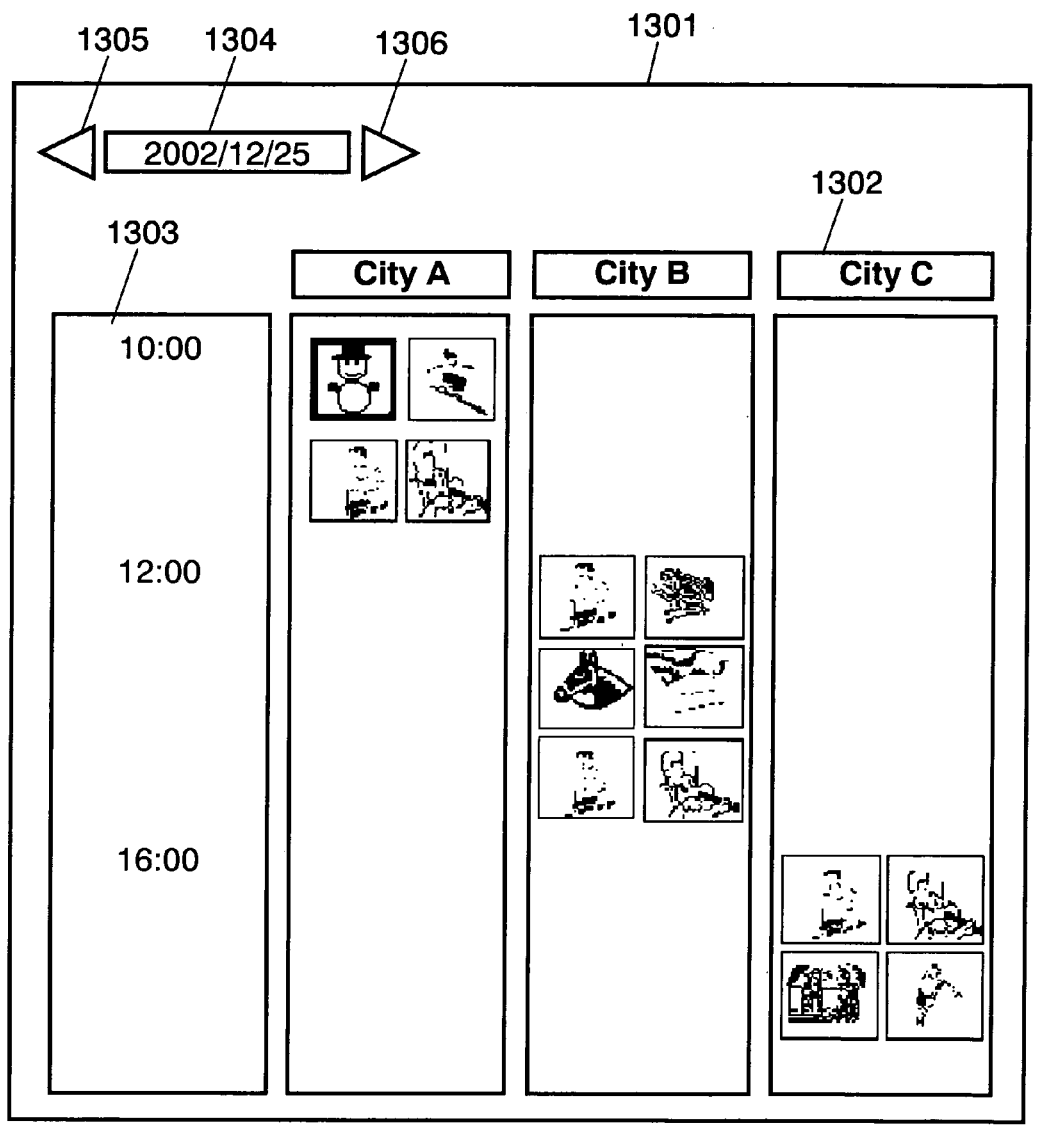
FIG. 13 is a view showing a thumbnail mode according to the second embodiment of the present invention.

FIG. 13 shows an example of thumbnail mode according to the second embodiment of the present invention. On display 108 of TV receiver 1100 or display 206 of remote controller 200, display area 1301 is formed by putting photography-location-row display area 1302 on the vertical axis, and time-period-column display area 1303 on the horizontal axis. Then, the thumbnail is placed somewhere in display area 1301 where both the photography location and time period agree with those of the thumbnail. In photography-location-row display area 1302, photography location rows are displayed based on information obtained from related information 504 (GPS information and photography time) of display image list 500. In time-period-column display area 1303, time period columns are displayed based on information obtained from related information 504 (GPS information and photography time) of display image list 500. In addition, a date list (not illustrated) is made from related information 504 (photography time) of display image list 500 so as to display the photography date on date display 1304. Moving the curser to previous-photography-date selection icon 1305 which is a left-facing triangle and pressing the Enter key makes it possible to display the thumbnails of images corresponding to the previous photography date. Moving the curser to next-photography-date selection icon 1306 which is a right-facing triangle and pressing the Enter key makes it possible to display the thumbnails of images corresponding to the next photography date. Every time the Enter key is pressed on the icons, the selected date is changed.

Although the second embodiment provides the two-dimensional display having the photography location rows on the vertical axis and the time period columns on the horizontal axis, it would be also possible to put the photography location rows on the horizontal axis and the time period columns on the vertical axis.

Figure 14:
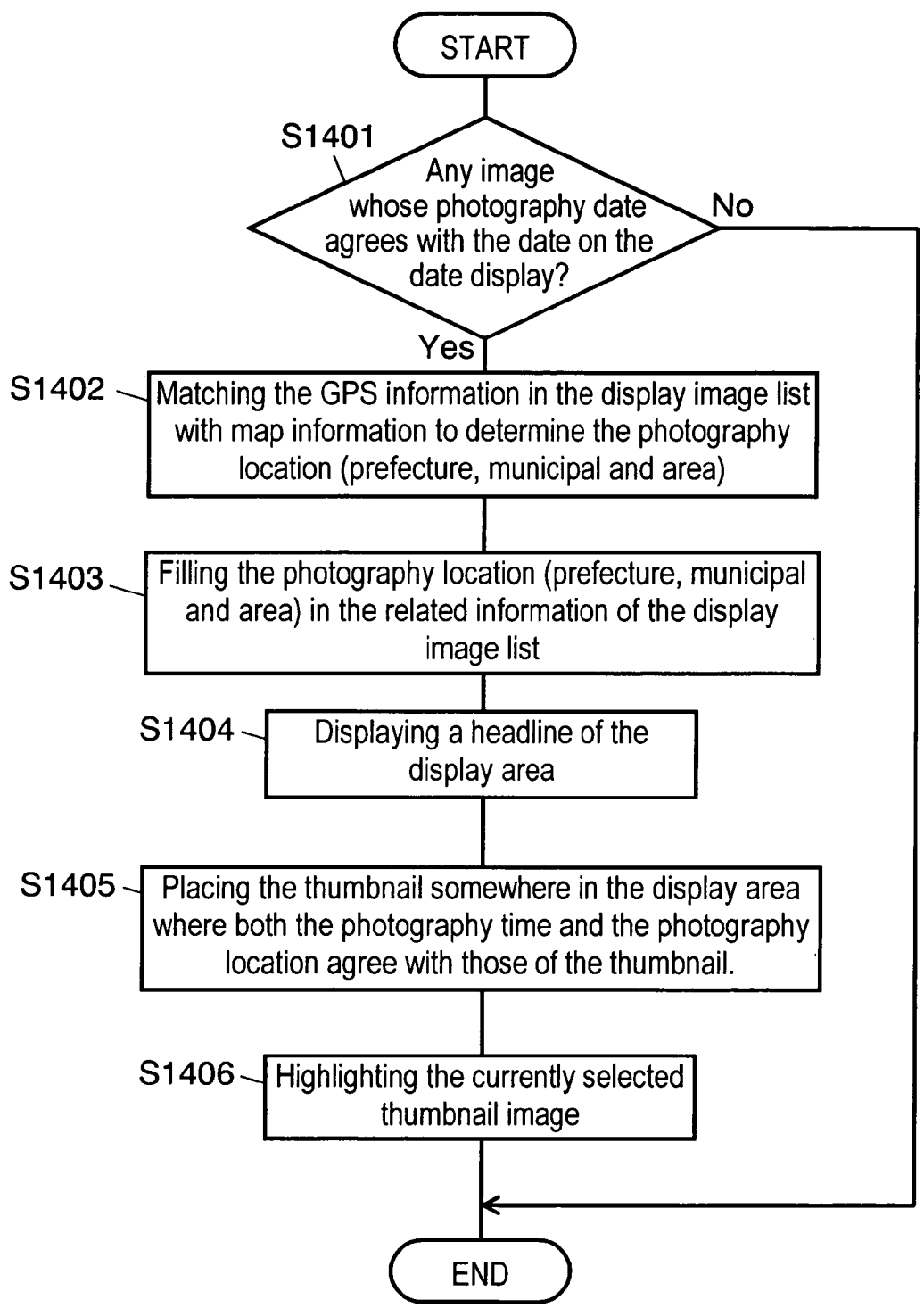
FIG. 14 is a flowchart depicting a process for thumbnail mode according to the second embodiment of the present invention.

The process to display thumbnails two dimensionally shown in FIG. 13 will be described as follows with reference to FIG. 14. When the date on date display 1304 is changed by the user, it is determined whether display image list 500 contains any image whose photography date agrees with the date on date display 1304 (S1401), and thumbnail mode is started. Then, from related information 504 (GPS information) of the image found in display image list 500, "north or south latitude", "latitude", "east or west longitude" and "longitude" are extracted to perform matching with map information 1200 stored in map information storage part 1101 (S1402). As a result, "prefecture", "municipal" and "area" are determined and filled in the item of related information 504 of display image list 500 (S1403). As the title of photography-location-row display area 1302, out of the items: "prefecture", "municipal" and "area" filled in display image list 500, the item that has been selected by the user or preset is displayed (S1404).

Each of the time columns is one hour in length, and the thumbnail is placed somewhere in a photography location row on the time column corresponding to related information 504 (the date and time of photography) in display image list 500. The number of thumbnails in each of the photography location rows can be selected by the user (S1405). When the thumbnails with the selected date are completely displayed, the currently selected thumbnail is highlighted (S1406).

Time periods in which no images were photographed are not displayed to minimize area with no thumbnails.

The user performs image selection with arrow keys 1005 on remote controller 1000, and can display a selected image in full screen mode with Enter key 1006.

As apparent from the aforementioned description, in the apparatus and method for displaying images according to the present invention, a selected image can be displayed in full screen mode or slide show mode on the TV receiver, while the thumbnails of images stored in the recording medium are being displayed on the remote controller. This improves both operability and visibility. Furthermore, detailed image information can be displayed on the remote controller, while a slide show is being displayed on the TV receiver. This facilitates the verification of information such as the date and time of photography and GPS information.

In addition, in the apparatus and method for displaying images according to the present invention, thumbnails can be displayed in the image display area with time periods on one of the vertical and horizontal axes, and photography locations on the other axis. This facilitates to find the location and time of photography.

The present invention employs a remote controller; however, it is also possible to employ a mobile apparatus such as a mobile phone terminal which has a display screen and can control a TV receiver.

INDUSTRIAL APPLICABILITY

The apparatus and method for displaying images according to the present invention enables a selected image to be displayed in full screen mode or slide show mode on the TV receiver, while the thumbnails of images stored in the recording medium are being displayed on the remote controller. This improves both operability and visibility. This apparatus and method also enables detailed image information to be displayed on the remote controller, while a slide show is being displayed on the TV receiver. This facilitates the verification of information such as the date and time of photography and GPS information. Thus, the present invention is expected to be applied for displaying images photographed by a GPS digital still camera via a recording medium reading device built in a TV receiver.

The invention claimed is:
1. An apparatus for displaying images comprising:
a TV receiver operable to display at least one image from a recording medium; and
a remote controller operable to control the TV receiver,
wherein the TV receiver comprises:
  a media insertion unit for inserting the recording medium;
  a media controller for forming a display image list, based on image information from the recording medium, when detecting insertion of the recording medium into the media insertion unit.
  a first display-image-list storage part for storing the display image list;
  a first display part; and
  a first controller for transmitting the display image list and image data of images stored in the recording medium to the remote controller,
wherein the remote controller comprises:
  a second display-image-list storage part for storing the display image list received from the TV receiver; and
  a second display part,
wherein the remote controller obtains the image data of the recording medium from the TV receiver when receiving the display image list from the TV receiver,
wherein the remote controller displays a plurality of images on the second display part simultaneously or sequentially, the plurality of images being from the image data that is decoded in the remote controller,
wherein the remote controller transmits a command to the TV receiver, when one or more images from the plurality of images displayed on the second display part is selected,
wherein the TV receiver displays the one or more images in full screen mode on the first display part when receiving the command from the remote controller,
wherein the first display part and the second display part are operable to display the one or more images as a two-dimensional array of thumbnail images, in which a first axis of the two-dimensional array represents a time period, and wherein the first display part and the second display, part are prevented from displaying for a time period when no image from the time period exists in the recording medium.

2. The apparatus for displaying images according to claim 1,
wherein a second axis of the two-dimensional array of thumbnail images represents a photography location.

3. A method for displaying images for a TV receiver operable to display at least one image from a recording medium and a remote controller operable to control the TV receiver, said method comprising:
forming, in the TV receiver, a display image list, based on image information from the recording medium, when detecting insertion of the recording medium into the TV receiver;
storing the display image list in the TV receiver;
transmitting the display image list and image data of images stored in the recording medium from the TV receiver to the remote controller;
storing the display image list received from the TV receiver in the remote controller;
obtaining, in the remote controller, the image data of the recording medium from the TV receiver when receiving the display image list from the TV receiver;
displaying, by the remote controller, a plurality of images on a display part of the remote controller simultaneously or sequentially, the plurality of images from the image data that is decoded in the remote controller;
transmitting, by the remote controller, a command to the TV receiver, when one or more images from the plurality of images displayed on the display part of the remote controller is selected,
displaying, by the TV receiver, the one or more images in full screen mode on a display part of the TV receiver when receiving the command from the remote controller,
wherein the displaying by the TV receiver and the displaying by the remote controller include displaying the one or more images as a two-dimensional array of thumbnail images, in which a first axis of the two-dimensional array represents a time period, and
wherein the displaying by the TV receiver and the displaying on by the remote controller include preventing the displaying on the TV receiver and the displaying the remote controller, respectively, for a time period when no image from the time period exists in the recording medium.

4. The method for displaying images according to claim 3, wherein a second axis of the two-dimensional array of thumbnail images represents a photography location.

5. The method for displaying images according to claim 3, further comprising
deleting the display image list stored in the remote controller when detecting extraction of the recording medium from the TV receiver.

6. The apparatus for displaying images according to claim 1,
wherein the display image list stored in the second display-image-list storage part is deleted when extraction of the recording medium from the media insertion unit is detected.

* * * * *